United States Patent
Chen et al.

(10) Patent No.: US 11,518,246 B2
(45) Date of Patent: Dec. 6, 2022

(54) ELECTRIC DRIVE SYSTEM, POWERTRAIN, AND ELECTRIC VEHICLE

(71) Applicant: Huawei Digital Power Technologies Co., Ltd., Shenzhen (CN)

(72) Inventors: Zhiyin Chen, Xi'an (CN); Yue Chen, Xi'an (CN); Xueliang Zhang, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/583,744

(22) Filed: Jan. 25, 2022

(65) Prior Publication Data

US 2022/0144093 A1    May 12, 2022

Related U.S. Application Data

(63) Continuation of application No. PCT/CN2021/110021, filed on Aug. 2, 2021.

(30) Foreign Application Priority Data

Oct. 21, 2020  (CN) .......................... 202011131419.2

(51) Int. Cl.
- *B60L 3/00* (2019.01)
- *H04L 12/40* (2006.01)
- *B60W 20/20* (2016.01)
- *B60W 20/30* (2016.01)

(52) U.S. Cl.
CPC ............. *B60L 3/003* (2013.01); *B60W 20/20* (2013.01); *H04L 12/40091* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2009/0021081 A1* | 1/2009 | Jacobson | H02M 1/42 307/77 |
| 2012/0091806 A1* | 4/2012 | Tsutsumi | H01M 10/345 307/43 |
| 2019/0305690 A1 | 10/2019 | Kusch et al. | |

FOREIGN PATENT DOCUMENTS

| | | |
|---|---|---|
| CN | 101162874 A | 4/2008 |
| CN | 105897004 A | 8/2016 |
| CN | 107666254 A | 2/2018 |

(Continued)

*Primary Examiner* — Todd Melton
*Assistant Examiner* — Jason R Roberson
(74) *Attorney, Agent, or Firm* — Conley Rose, P.C.

(57) ABSTRACT

An electric drive system is connected to power batteries and includes a bus, a three-level inverter circuit, a direct current (DC)-DC conversion circuit, and a controller. The bus includes a positive bus and a negative bus. The three-level inverter circuit includes a first bus capacitor and a second bus capacitor. The first bus capacitor is connected between the positive bus and a bus neutral point, and the second bus capacitor is connected between the negative bus and the bus neutral point. The DC-DC conversion circuit includes a first conversion circuit and a second conversion circuit, an input terminal of the first conversion circuit is connected in parallel to the first bus capacitor, and an input terminal of the second conversion circuit is connected in parallel to the second bus capacitor.

20 Claims, 9 Drawing Sheets

(56) References Cited

FOREIGN PATENT DOCUMENTS

| CN | 111277157 A | 6/2020 |
| CN | 112436779 A | 3/2021 |

\* cited by examiner

ELECTRIC DRIVE SYSTEM, POWERTRAIN, AND ELECTRIC VEHICLE

CROSS-REFERENCE TO RELATED APPLICATIONS

This is a continuation of International Patent Application No. PCT/CN2021/110021 filed on Aug. 2, 2021, which claims priority to Chinese Patent Application No. 202011131419.2 filed on Oct. 21, 2020. The disclosures of the aforementioned applications are hereby incorporated by reference in their entireties.

TECHNICAL FIELD

This disclosure relates to the field of power electronic technologies, and in particular, to an electric drive system, a control method, a powertrain, and an electric vehicle.

BACKGROUND

With aggravation of an energy shortage and environmental pollution in the modern society, as new energy vehicles, electric vehicles have drawn widespread attention. Because electric drive systems of the electric vehicles directly affect safety and efficiency of the electric vehicles, the electric drive systems have always been a hot research topic.

Compared with a conventional two-level electric drive system, a three-level electric drive system can effectively improve New European Driving Cycle (NEDC) efficiency of an electric drive system, reduce output voltage harmonics, optimize electromagnetic interference performance, and the like. Therefore, the three-level electric drive system is gradually becoming a research object.

FIG. 1 is a schematic diagram of a three-level inverter circuit in a conventional technology.

The three-level inverter circuit 10 is configured to convert a direct current (DC) provided by power batteries into an alternating current, and supply the alternating current to a motor 20. Balance of a potential of a bus neutral point of the three-level inverter circuit 10 directly affects performance of a three-level electric drive system.

In a conventional technology, a potential of a bus neutral point can be balanced by adding a hardware balanced circuit 30, but control over the hardware balanced circuit 30 needs to be independently adjusted by a software algorithm, and a reserved heat dissipation structure needs to be designed for a high-loss device in the hardware balanced circuit 30. Consequently, a volume and costs of the three-level electric drive system are increased.

SUMMARY

To resolve the foregoing problem in the conventional technology, this application provides an electric drive system, a control method, a powertrain, and an electric vehicle to reduce a volume and costs of a three-level electric drive system.

According to a first aspect, this application provides an electric drive system. An input terminal of the electric drive system is connected to power batteries of an electric vehicle. The electric drive system includes a bus, a three-level inverter circuit, a DC-DC conversion circuit, and a controller. The bus includes a positive bus and a negative bus. The three-level inverter circuit includes a first bus capacitor and a second bus capacitor. The first bus capacitor is connected between the positive bus and a bus neutral point, and the second bus capacitor is connected between the negative bus and the bus neutral point. An output terminal of the three-level inverter circuit is a high-voltage alternating current output terminal, and is connected to a motor of the electric vehicle. The DC-DC conversion circuit includes a first conversion circuit and a second conversion circuit, an input terminal of the first conversion circuit is connected in parallel to the first bus capacitor, and an input terminal of the second conversion circuit is connected in parallel to the second bus capacitor. An output terminal of the DC-DC conversion circuit is a low-voltage direct current output terminal of the electric drive system, and is connected to a low-voltage system and/or a battery of the electric vehicle. The controller is configured to control the first conversion circuit and the second conversion circuit.

In the solution provided in this application, each of the two bus capacitors is connected in parallel to a conversion circuit, to be specific, the first conversion circuit obtains power from the first bus capacitor, and the second conversion circuit obtains power from the second bus capacitor. The controller controls operating statuses of the two conversion circuits to balance a potential of the bus neutral point. The DC-DC conversion circuit of the electric drive system is a key portion for supplying power to the low-voltage system and the battery of the electric vehicle. In this application, by reusing the DC-DC circuit, the potential of the bus neutral point of the three-level inverter circuit is balanced, and a volume and costs of the three-level electric drive system are reduced.

In addition, for a solution in a conventional technology in which an input terminal of a DC-DC circuit is directly connected in parallel to power batteries, a requirement on a voltage withstand value of a power device is high. Consequently, product selection is difficult, and costs are high. However, in the solution in this application, a requirement on a voltage withstand value of a power device in each conversion circuit is approximately half of that in the solution in the conventional technology, thereby reducing a switching loss of the power device. In a same output power, a power device with a smaller voltage withstand value may be selected for the DC-DC circuit in this application, thereby facilitating product selection and design. In addition, when a volume of the power batteries remains unchanged, currently, to maximize an endurance mileage of an electric vehicle, high-voltage power batteries are usually selected to supply power. In the electric drive system provided in this application, the solution in which the high-voltage power batteries are used to supply power can be implemented more conveniently.

With reference to the first aspect, in a first possible implementation manner, the controller controls operating statuses of the first conversion circuit and the second conversion circuit based on at least one of a voltage sample value of the bus and an output current sample value of the three-level inverter circuit.

The voltage sample value of the bus directly represents current voltages of the positive bus and the negative bus. When a voltage sample value of the positive bus is different from an absolute value of a voltage sample value of the negative bus, it indicates that a potential of the bus neutral point is unbalanced currently.

An output current of the three-level inverter circuit may represent statuses of the current voltages of the positive bus and the negative bus. When the potential of the bus neutral point is balanced, a direct current component of the output current is 0, when the voltage of the positive bus is higher than the voltage of the negative bus, a direct current component of the output current is greater than 0, or when the voltage of the positive bus is lower than the voltage of the negative bus, a direct current component of the output current is less than 0.

With reference to the first aspect, in a second possible implementation, an output terminal of the first conversion circuit is connected in parallel to an output terminal of the second conversion circuit to provide a stable low-voltage direct current output.

With reference to the first aspect, in a third possible implementation, when a voltage sample value of the positive bus is greater than an absolute value of a voltage sample value of the negative bus and/or a direct current component of the output current sample value is greater than 0 and when it is determined that a voltage of the positive bus is greater than an absolute value of a voltage of the negative bus, the controller controls an output power of the first conversion circuit to increase, controls an output power of the second conversion circuit to decrease, and keeps a total output power of the DC-DC conversion circuit unchanged, or when a voltage sample value of the positive bus is less than an absolute value of a voltage sample value of the negative bus and/or a direct current component of the output current sample value is less than 0 and when it is determined that a voltage of the positive bus is less than an absolute value of a voltage of the negative bus, the controller controls an output power of the first conversion circuit to decrease, controls an output power of the second conversion circuit to increase, and keeps a total output power of the DC-DC conversion circuit unchanged.

With reference to the first aspect, in a fourth possible implementation, the first conversion circuit includes a first inverter circuit and a first rectifier circuit. An input terminal of the first inverter circuit is the input terminal of the first conversion circuit, an output terminal of the first inverter circuit is connected to an input terminal of the first rectifier circuit, and an output terminal of the first rectifier circuit is the output terminal of the first conversion circuit. The second conversion circuit includes a second inverter circuit and a second rectifier circuit. An input terminal of the second inverter circuit is the input terminal of the second conversion circuit, an output terminal of the second inverter circuit is connected to an input terminal of the second rectifier circuit, and an output terminal of the second rectifier circuit is the output terminal of the second conversion circuit.

With reference to the first aspect, in a fifth possible implementation, the first conversion circuit and the second conversion circuit are full bridge LLC resonant conversion circuits.

With reference to the first aspect, in a sixth possible implementation, the first rectifier circuit and the second rectifier circuit are full bridge rectifier circuits, and the full bridge rectifier circuit each include a controllable switch tube. The controller controls an operating status of the controllable switch tube to adjust a total output power of the DC-DC conversion circuit.

With reference to the first aspect, in a seventh possible implementation, the first conversion circuit includes a first full bridge LLC resonant conversion circuit, and the second conversion circuit includes a second full bridge LLC resonant conversion circuit. The first full bridge LLC resonant conversion circuit and the second full bridge LLC resonant conversion circuit have same dotted terminals of primary-side windings and same quantities of turns of coils and share a magnetic core of a transformer, and a secondary-side winding of the transformer is connected to a third rectifier circuit. The first full bridge LLC resonant conversion circuit and the second full bridge LLC resonant conversion circuit have same resonance frequencies.

With reference to the first aspect, in an eighth possible implementation, the controller controls the first full bridge LLC resonant conversion circuit and the second full bridge LLC resonant conversion circuit based on a same control signal.

With reference to the first aspect, in a ninth possible implementation, the controller is further configured to adjust a switching frequency of the control signal based on at least one of the voltage sample value of the bus and the output current sample value of the three-level inverter circuit, so as to adjust a total output power of the DC-DC conversion circuit.

With reference to the first aspect, in a tenth possible implementation, the controller is further configured to adjust a switching frequency of the control signal based on a voltage requirement of the output terminal of the DC-DC conversion circuit.

With reference to the first aspect, in an eleventh possible implementation, the third rectifier circuit is a full bridge rectifier circuit, and the full bridge rectifier circuit includes a controllable switch tube. The controller further controls an operating status of the controllable switch tube to adjust a total output power of the DC-DC conversion circuit.

With reference to the first aspect, in a twelfth possible implementation, the controller is further configured to control an operating status of the three-level inverter circuit. In other words, the controller may be integrated with a controller of the three-level inverter circuit.

According to a second aspect, this application further provides a control method for an electric drive system. The control method is applied to the electric drive system according to any one of the first aspect and the implementations of the first aspect. The control method includes controlling operating statuses of the first conversion circuit and the second conversion circuit.

By using this method, a voltage of a bus neutral point is balanced, and a volume and costs of the three-level electric drive system are reduced.

With reference to the second aspect, in a first possible implementation, the controlling operating statuses of the first conversion circuit and the second conversion circuit includes controlling the operating statuses of the first conversion circuit and the second conversion circuit based on at least one of a voltage sample value of the bus and an output current sample value of the three-level inverter circuit.

According to a third aspect, this application further provides a powertrain. The powertrain includes the electric drive system according to the first aspect, and further includes a motor. The motor is connected to an output terminal of the three-level inverter circuit. The motor is configured to convert electrical energy into mechanical energy to drive the electric vehicle.

According to a fourth aspect, this application further provides an electric vehicle. The electric vehicle includes the powertrain according to the third aspect, and further includes power batteries. The power batteries are configured to supply a required direct current to the powertrain.

DESCRIPTION OF EMBODIMENTS

To enable a person skilled in the art to better understand technical solutions provided in embodiments of this application, the following first describes an electric drive system of an electric vehicle.

Figure 1:
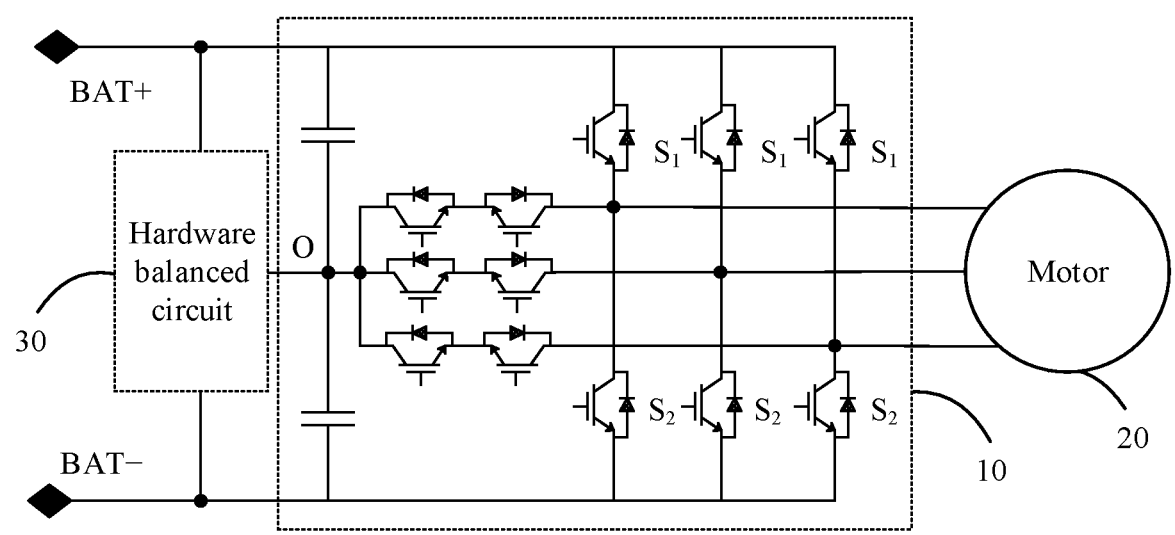
FIG. 1 is a schematic diagram of a three-level inverter circuit in a conventional technology.
Figure 2:
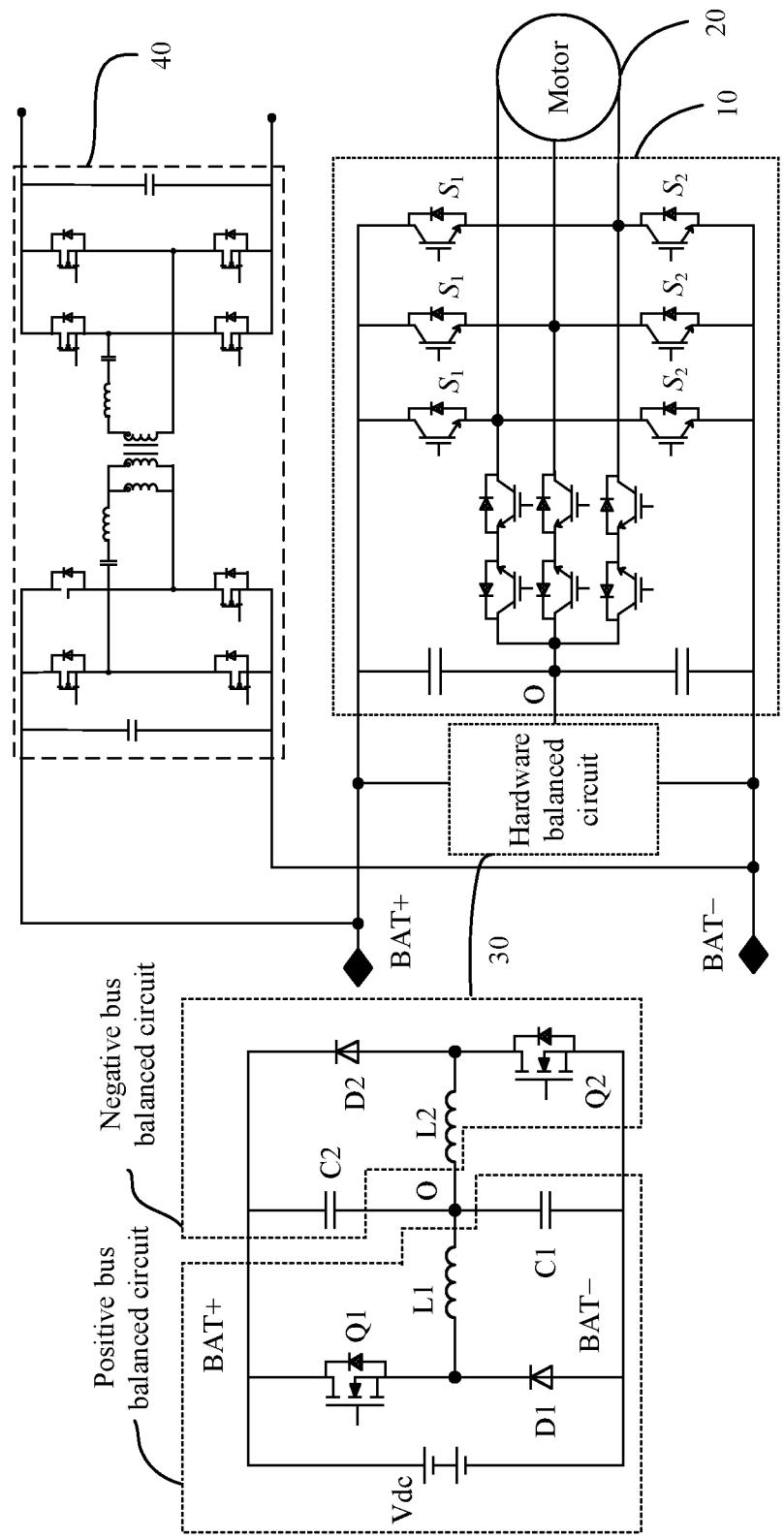
FIG. 2 is a schematic diagram of a three-level electric drive system corresponding to FIG. 1.

FIG. 2 is a schematic diagram of a three-level electric drive system corresponding to FIG. 1.

In the three-level electric drive system, a three-level inverter circuit 10 is used to convert a direct current provided by power batteries into an alternating current, and supply the alternating current to a motor, a DC-DC conversion circuit 40 is used to convert a high-voltage direct current provided by the power batteries into a low-voltage direct current, charge a vehicle-mounted low-voltage battery (where a voltage is generally 12 volts (V)), and stably supply power to another low-voltage device on the vehicle.

Balance of a potential of a bus neutral point of the three-level inverter circuit 10 directly affects many indicators such as a withstand voltage of a power device in the three-level inverter circuit 10 and a harmonic of an output current. In a conventional technology, the potential of the bus neutral point is balanced by adding a hardware balanced circuit 30 to the three-level electric drive system.

The added hardware balanced circuit 30 includes a power semiconductor device and a magnetic device. A control system needs to independently perform software algorithm adjustment to implement hardware balance detection and active control functions. In addition, a reserved heat dissipation structure needs to be designed for a high-loss device. Therefore, a volume and costs of the three-level electric drive system are increased.

To resolve the foregoing problem existing in the conventional technology, this application provides an electric drive system, a control method, a powertrain, and an electric vehicle. A DC-DC circuit of the system includes two conversion circuits, which are separately connected in parallel to a bus capacitor. A controller controls operating statuses of the two conversion circuits to balance a potential of a bus neutral point. According to the solution in this application, by reusing the DC-DC circuit, the potential of the bus neutral point of the three-level inverter circuit is balanced, and the volume and costs of the three-level electric drive system are reduced.

Terms "first" and "second" in description of this application are only used for descriptive purposes, and cannot be understood as indicating or implying relative importance or implicitly indicating quantities of indicated technical features.

In this application, unless otherwise expressly specified and limited, the term "connection" should be understood in a broad sense. For example, the "connection" may be a fixed connection, a detachable connection, or an integration, and may be a direct connection or an indirect connection through an intermediate medium.

Embodiment 1

This embodiment of this application provides an electric drive system. The electric drive system is described in detail below with reference to the accompanying drawings.

Figure 3:
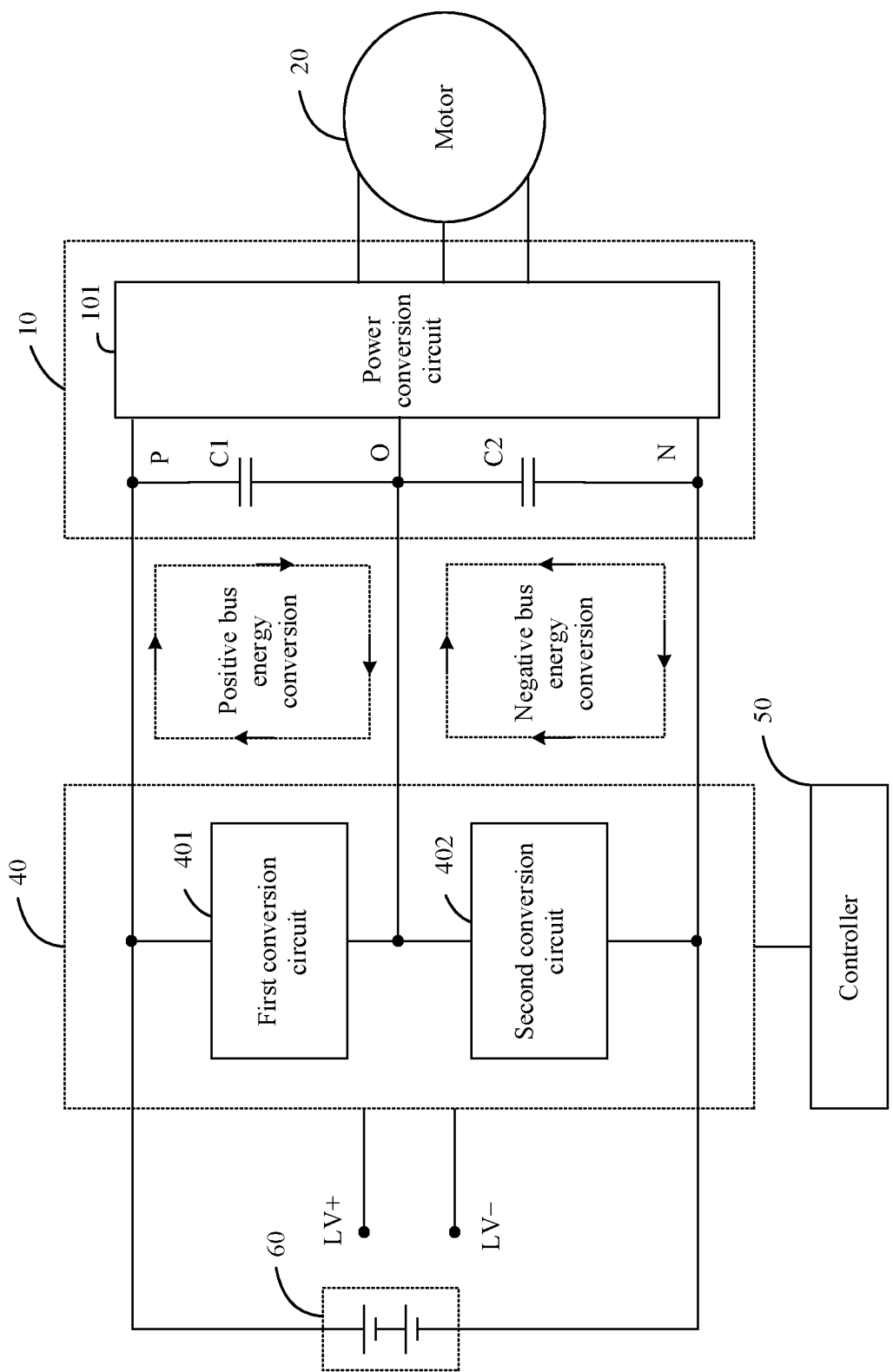
FIG. 3 is a schematic diagram of an electric drive system according to an embodiment of this application.

FIG. 3 is a schematic diagram of an electric drive system according to this embodiment of this application.

The electric drive system includes a bus, a three-level inverter circuit 10, a DC-DC conversion circuit 40, and a controller 50.

The bus includes a positive bus P and a negative bus N.

An input terminal of the three-level inverter circuit 10 is connected to power batteries 60, and an output terminal of the three-level inverter circuit 10 is connected to a motor 20.

The three-level inverter circuit 10 is a neutral point clamped (NPC) three-level inverter circuit. The three-level inverter circuit 10 includes a first bus capacitor C1, a second bus capacitor C2, and a power conversion circuit 101.

The first bus capacitor C1 is connected between the positive bus P and a bus neutral point O, and the second bus capacitor C2 is connected between the negative bus N and the bus neutral point O.

Figure 4:
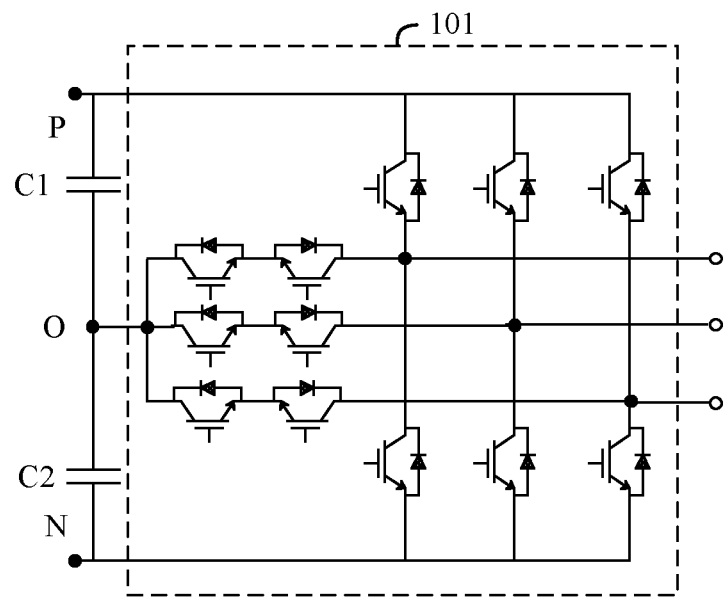
FIG. 4 is a schematic diagram of a power conversion circuit of a three-level inverter circuit according to an embodiment of this application.
Figure 5:
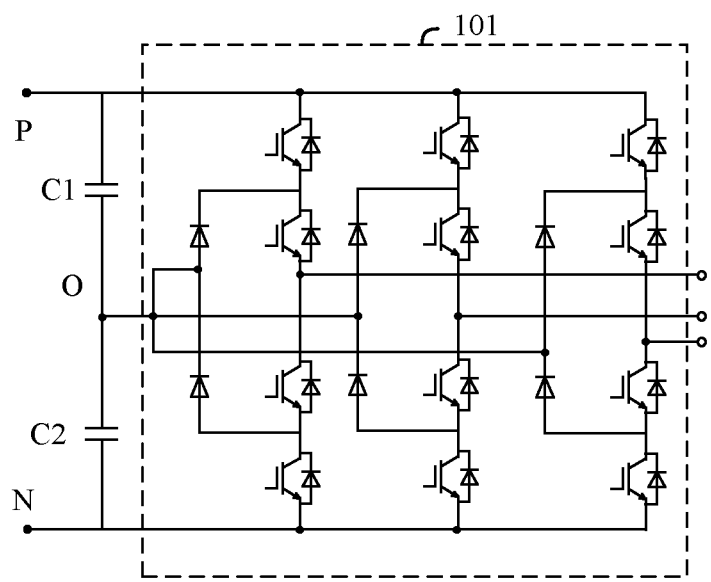
FIG. 5 is a schematic diagram of a power conversion circuit of another three-level inverter circuit according to an embodiment of this application.

The power conversion circuit 101 is configured to convert a direct current provided by the power batteries 60 into an alternating current, and supply the alternating current to the motor 20. Refer to schematic diagrams of power conversion circuits shown in FIG. 4 and FIG. 5. FIG. 4 is a schematic diagram of the power conversion circuit 101 using a "T" connection. FIG. 5 is a schematic diagram of the power conversion circuit 101 using an "I" connection.

A specific implementation and a working principle of the power conversion circuit 101 are relatively mature technologies, and are not described herein in this embodiment of this application.

The DC-DC conversion circuit 40 is configured to supply power to a low-voltage system in an electric vehicle and charge a low-voltage battery. The DC-DC conversion circuit 40 includes a first conversion circuit 401 and a second conversion circuit 402.

An input terminal of the first conversion circuit 401 is connected in parallel to the first bus capacitor C1, that is, the first conversion circuit 401 obtains power from the first bus capacitor C1. An input terminal of the second conversion circuit 402 is connected in parallel to the second bus capacitor C2, that is, the second conversion circuit 402 obtains power from the second bus capacitor C2.

The controller 50 controls operating statuses of the first conversion circuit 401 and the second conversion circuit 402 to implement energy conversion of the positive bus and the negative bus shown in the figure, so that a potential of the bus neutral point is balanced.

In this embodiment, the controller 50 may be an application-specific integrated circuit (ASIC), a programmable logic device (PLD), a digital signal processor (DSP), or a combination thereof. The PLD may be a complex PLD (CPLD), a field-programmable gate array (FPGA), generic array logic (GAL), or any combination thereof. This is not limited in this embodiment of this application.

The first conversion circuit 401 and the second conversion circuit 402 each include a controllable switch tube. A type of the controllable switch tube is not limited in this embodiment of this application. For example, the controllable switch tube may be an insulated-gate bipolar transistor (IGBT), a metal oxide semiconductor field effect transistor (MOSFET)(, which is briefly referred to as a MOS tube), or a silicon carbide (SiC) MOSFET.

The controller 50 may send a pulse-width modulation (PWM) signal to the controllable switch tube to control an operating status of the controllable switch tube.

In conclusion, the two bus capacitors of the electric drive system provided in this embodiment of this application each are connected in parallel to a conversion circuit. The controller controls the operating statuses of the two conversion circuits to balance the potential of the bus neutral point. By reusing the DC-DC circuit in the electric drive system, the potential of the bus neutral point of the three-level inverter circuit is balanced, and a volume and costs of a three-level electric drive system are reduced.

If a volume of the power batteries remains unchanged, to maximize an endurance mileage of the electric vehicle currently, high-voltage power batteries are often selected to supply power. For example, power batteries with an output voltage of 550 V to 850 V are used to supply power. However, in the conventional technology, the input terminal of the DC-DC circuit is directly connected in parallel to the power batteries, and a requirement on a voltage withstand value of a power device thereof is high. During product selection, a device with a large voltage withstand value (greater than 900 V) and a large current withstand value needs to be selected. Consequently, the product selection and design of the power device are difficult, and costs are high. However, in this application, a requirement on a voltage withstand value of a power device in each conversion circuit is approximately half of that in the solution in the conventional technology, thereby reducing a switching loss of the power device. In a same output power, a power device with a smaller voltage withstand value (for example, 650 V) may be selected for the DC-DC circuit in this application, thereby facilitating product selection and design. In the electric drive system provided in this application, the solution in which the high-voltage power batteries are used to supply power can be implemented conveniently.

Embodiment 2

The following describes a working principle of an electric drive system with reference to a specific implementation of a DC-DC circuit.

Figure 6:
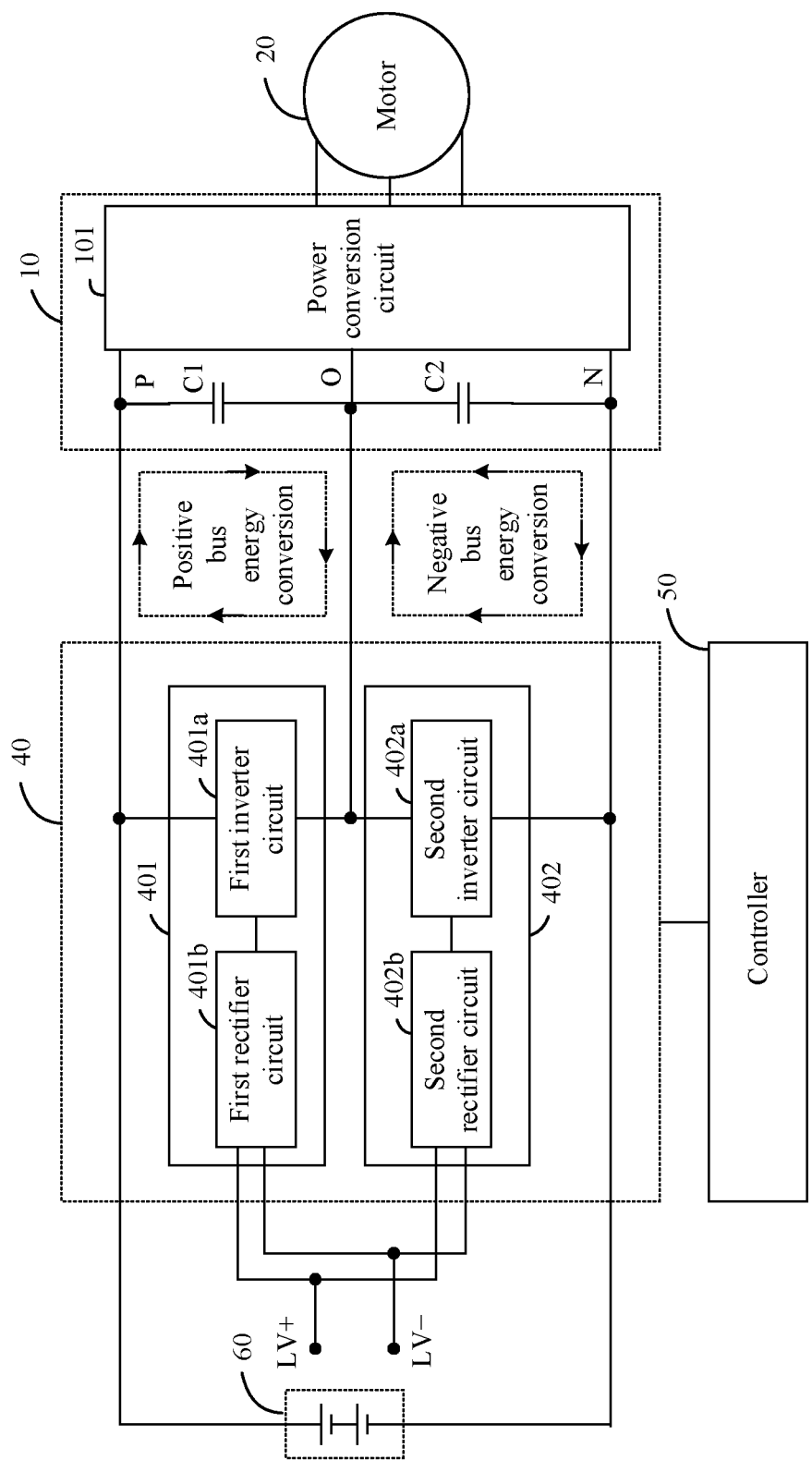
FIG. 6 is a schematic diagram of another electric drive system according to an embodiment of this application.

FIG. 6 is a schematic diagram of another electric drive system according to this embodiment of this application.

A first conversion circuit 401 includes a first inverter circuit 401*a* and a first rectifier circuit 401*b*. A second conversion circuit 402 includes a second inverter circuit 402*a* and a second rectifier circuit 402*b*.

An input terminal of the first inverter circuit 401*a* is an input terminal of the first conversion circuit 401, an output terminal of the first inverter circuit 401*a* is connected to an input terminal of the first rectifier circuit 401*b*, and an output terminal of the first rectifier circuit 401*b* is an output terminal of the first conversion circuit 401. After the first inverter circuit 401*a* converts a voltage obtained from two terminals of a first bus capacitor C1 into an alternating current, the first rectifier circuit 401*b* rectifies the alternating current into a direct current for output.

An input terminal of the second inverter circuit 402*a* is an input terminal of the second conversion circuit 402, an output terminal of the second inverter circuit 402*a* is connected to an input terminal of the second rectifier circuit 402*b*, and an output terminal of the second rectifier circuit 402*b* is an output terminal of the second conversion circuit 402. After the second inverter circuit 402*a* converts a voltage obtained from two terminals of a second bus capacitor C2 into an alternating current, the second rectifier circuit 402*b* rectifies the alternating current into a direct current for output.

The output terminal of the first rectifier circuit 401*b* is connected in parallel to an output terminal of the second rectifier circuit 402*b* to output a stable low-voltage direct current.

A working principle of a controller 50 is described in detail below.

The controller 50 may control operating statuses of the first conversion circuit 401 and the second conversion circuit 402 based on at least one of a voltage sample value of a bus and an output current sample value of a three-level inverter circuit 10, to balance a potential of a bus neutral point.

A principle of balancing the potential of the bus neutral point by using the voltage sample value of the bus is first described below.

The voltage sample value of the bus directly represents current voltages of a positive bus and a negative bus. When a voltage sample value of the positive bus is different from an absolute value of a voltage sample value of the negative bus, it indicates that the potential of the bus neutral point is unbalanced currently.

When the voltage sample value of the positive bus is equal to the absolute value of the voltage sample value of the negative bus, it indicates that the current voltage of the positive bus is equal to an absolute value of the voltage of the negative bus. In this case, the potential of the bus neutral point is balanced. The controller 50 controls output powers of the first conversion circuit 401 and the second conversion circuit 402 to be the same.

When a voltage sample value of the positive bus is greater than an absolute value of a voltage sample value of the negative bus, it indicates that a current voltage of the positive bus is greater than an absolute value of a voltage of the negative bus. In this case, the controller controls the output power of the first conversion circuit 401 to increase, controls the output power of the second conversion circuit 402 to decrease, and keeps a total output power of a DC-DC conversion circuit unchanged. In this case, an amount of power obtained by the first conversion circuit 401 from a first direct current bus C1 increases, so that the voltage of the positive bus decreases. When the voltage of the positive bus decreases to the absolute value of the voltage of the negative bus, the controller 50 controls the output powers of the first conversion circuit 401 and the second conversion circuit 402 to be the same. In this way, the potential of the bus neutral point is balanced.

When a voltage sample value of the positive bus is less than an absolute value of a voltage sample value of the negative bus, it indicates that a current voltage of the positive bus is less than an absolute value of a voltage of the negative bus. In this case, the controller controls the output power of the first conversion circuit 401 to decrease, controls the output power of the second conversion circuit to increase, and keeps a total output power of a DC-DC conversion circuit unchanged. In this case, an amount of power obtained by the second conversion circuit 402 from a second direct current bus C2 increases, so that the absolute value of the voltage of the negative bus decreases. When the absolute value of the voltage of the negative bus decreases to the voltage of the positive bus, the controller 50 controls the output powers of the first conversion circuit 401 and the second conversion circuit 402 to be the same. In this way, the potential of the bus neutral point is balanced.

For ease of understanding, an example in which an output voltage of power batteries is 750 V is used. In this case, when the voltage of the positive bus is +375 V and the voltage of the negative bus is −375 V, the voltage sample values currently corresponding to the positive bus and the negative bus are the same, and the potential of the neutral point of the direct current bus is balanced. When the voltage of the positive bus is +380 V and the voltage of the negative bus is −370 V, the voltage sample value of the positive bus is greater than the absolute value of the voltage sample value of the negative bus, and it indicates that the current voltage of the positive bus is too high. In this case, the controller 50 controls the output power of the first conversion circuit 401 to increase to decrease the voltage of the positive bus. When the voltage of the positive bus is +370 V and the voltage of the negative bus is −380 V, the voltage sample value of the positive bus is less than the absolute value of the voltage sample value of the negative bus, and it indicates that the current voltage of the negative bus is too high (the absolute value of the voltage of the negative bus is large). In this case, the controller 50 controls the output power of the second conversion circuit 402 to increase to decrease the voltage of the negative bus (that is, to increase the absolute value of the voltage of the negative bus).

In actual application, in consideration of impact of a measurement error, a deviation threshold may be preset in this embodiment of this application. When a difference between a sample voltage of the positive bus and an absolute value of a sample voltage of the negative bus is less than the deviation threshold, it is determined that the potential of the neutral point of the direct current bus is balanced. When the foregoing difference is greater than or equal to the deviation threshold, it is determined that the potential of the neutral point of the bus is unbalanced, and the output powers of the two conversion circuits start to be adjusted.

The deviation threshold is a small value, may be determined based on an actual situation, and is not limited in this embodiment of this application. For example, when the deviation threshold indicates that the difference between the voltage of the positive bus and the absolute value of the voltage of the negative bus is less than 5 V, it is determined that the potential of the neutral point of the direct current bus is balanced.

A principle of balancing the potential of the bus neutral point by using an output current sample value of a three-level inverter circuit is described below.

An output current of the three-level inverter circuit may indicate the current voltages of the positive bus and the negative bus. When the potential of the bus neutral point is balanced, a direct current component of the output current is 0, when the voltage of the positive bus is higher than the voltage of the negative bus, a direct current component of the output current is greater than 0, or when the voltage of the positive bus is lower than the voltage of the negative bus, a direct current component of the output current is less than 0.

Therefore, the controller 50 may control the operating statuses of the first conversion circuit 401 and the second conversion circuit 402 by using a direct current component of the output current sample value of the three-level inverter circuit.

When the direct current component of the output current sample value is 0, the potential of the bus neutral point is balanced. The controller 50 controls output powers of the first conversion circuit 401 and the second conversion circuit 402 to be the same.

When the direct current component of the output current sample value is greater than 0, the controller 50 controls the output power of the first conversion circuit 401 to increase, controls the output power of the second conversion circuit 402 to decrease, and keeps the total output power of the DC-DC conversion circuit unchanged. In this case, an amount of power obtained by the first conversion circuit 401 from the first direct current bus C1 increases, so that the voltage of the positive bus decreases. After the direct current component of the output current sample value changes to 0, the controller 50 controls the output powers of the first conversion circuit 401 and the second conversion circuit 402 to be the same. In this way, the potential of the bus neutral point is balanced.

When the direct current component of the output current sample value is less than 0, the controller controls the output power of the first conversion circuit 401 to decrease, controls the output power of the second conversion circuit to increase, and keeps the total output power of the DC-DC conversion circuit unchanged. In this case, an amount of power obtained by the second conversion circuit 402 from the second direct current bus C2 increases, so that the absolute value of the voltage of the negative bus decreases. After the direct current component of the output current sample value changes to 0, the controller 50 controls the output powers of the first conversion circuit 401 and the second conversion circuit 402 to be the same. In this way, the potential of the bus neutral point is balanced.

In actual application, in consideration of impact of a measurement error, a deviation interval may be preset in this embodiment of this application. When the direct current component of the output current sample value is within the deviation interval, it is determined that the potential of the neutral point of the direct current bus is balanced. When the direct current component of the output current sample value is beyond the deviation interval, it is determined that the potential of the neutral point of the bus is unbalanced, and the output powers of the two conversion circuits start to be adjusted.

The deviation interval is a small interval, may be determined based on an actual situation, and is not limited in this embodiment of this application.

The controller 50 may use either of the foregoing two manners as a criterion to control the operating statuses of the first conversion circuit 401 and the second conversion circuit 402. The controller 50 may alternatively use both of the foregoing two manners as criteria, and when determining that the potential of the bus neutral point is unbalanced based on one of the foregoing results, start to adjusts the output powers of the two conversion circuits, or when determining that the potential of the bus neutral point is unbalanced based on the foregoing two results, start to adjust the output powers of the two conversion circuits.

Figure 7:
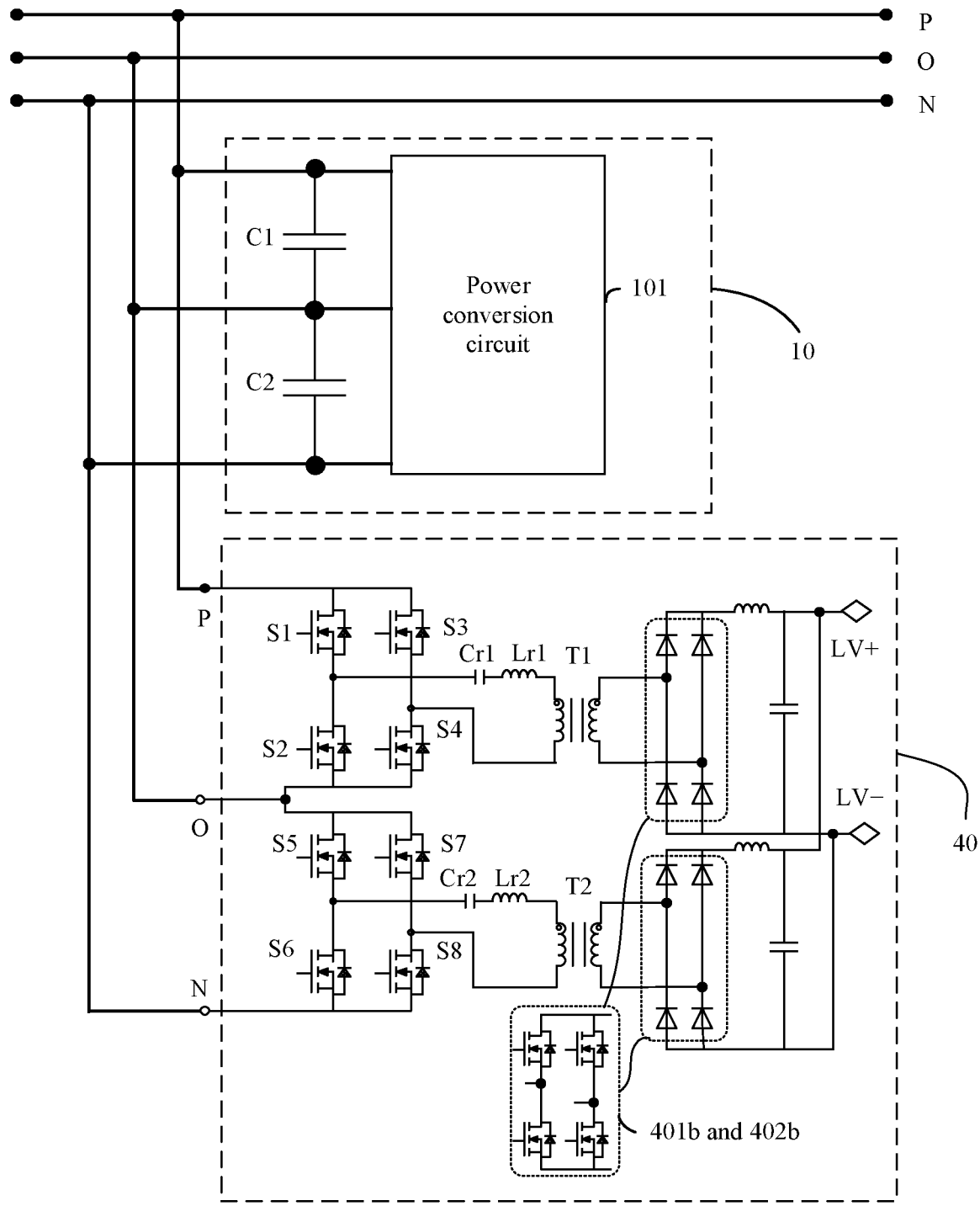
FIG. 7 is a schematic diagram of still another electric drive system according to an embodiment of this application.

FIG. 7 is a schematic diagram of still another electric drive system according to this embodiment of this application.

FIG. 7 illustrates a specific implementation of a DC-DC conversion circuit 40. A first conversion circuit and a second conversion circuit in the figure are both full bridge LLC resonant conversion circuits.

S1 to S8 in the figure are controllable switch devices.

For the first conversion circuit, an upper half bridge arm of a first bridge arm includes S1, and a lower half bridge arm of the first bridge arm includes S2, and an upper half bridge arm of a second bridge arm includes S3, and a lower half bridge arm of the second bridge arm includes S4. A neutral point of the first bridge arm is connected to a neutral point of the second bridge arm through a first capacitor Cr1, a first inductor Lr1, and a primary-side winding of a transformer T1. The first capacitor Cr1, the first inductor Lr1, and the primary-side winding of the transformer T1 form an LLC resonant circuit. A secondary-side winding of the transformer T1 is connected to a first rectifier circuit 401a.

For the second conversion circuit, an upper half bridge arm of a first bridge arm includes S5, and a lower half bridge arm of the first bridge arm includes S6, and an upper half bridge arm of a second bridge arm includes S7, and a lower half bridge arm of the second bridge arm includes S8. A neutral point of the first bridge arm is connected to a neutral point of the second bridge arm through a second capacitor Cr2, a second inductor Lr2, and a primary-side winding of a transformer T2. The second capacitor Cr2, the second inductor Lr2, and the primary-side winding of the transformer T2 form an LLC resonant circuit. A secondary-side winding of the transformer T2 is connected to a second rectifier circuit 401b.

The first rectifier circuit 401a and the second rectifier circuit 401b are full bridge rectifier circuits.

In a possible implementation, each half bridge arm of the first rectifier circuit 401a and the second rectifier circuit 401b includes a diode.

In another possible implementation, each half bridge arm of the first rectifier circuit 401a and the second rectifier circuit 401b includes a controllable switch tube. In this case, the controller 50 may further control operating statuses of controllable switch tubes in the full bridge rectifier circuits to adjust a total output power of a DC-DC conversion circuit, so as to match a change in a power requirement on an output side and improve an adjustment capability of the DC-DC conversion circuit 40.

In some embodiments, the controller 50 may control an operating status of a power conversion circuit 101, in other words, a controller of the DC-DC conversion circuit 40 and a controller of the three-level inverter circuit 10 may be integrated together.

In conclusion, the two bus capacitors of the electric drive system provided in this embodiment of this application each are connected in parallel to a conversion circuit. The controller controls the operating statuses of the two conversion circuits to balance the potential of the bus neutral point. According to this application, by reusing the DC-DC circuit, the potential of the bus neutral point of the three-level inverter circuit is balanced, and a volume and costs of the three-level electric drive system are reduced.

In addition, in this application, a requirement on a voltage withstand value of a power device in each conversion circuit is approximately half of that in the solution in the conventional technology, thereby reducing a switching loss of the power device. In a same output power, a power device with a smaller voltage withstand value may be selected for the DC-DC circuit in this application, thereby facilitating product selection and design. Further, the solution in which the high-voltage power batteries are used to supply power can be implemented conveniently. In addition, the output terminals of the two conversion circuits are connected in parallel, and may further supply a stable direct current to a low-voltage system and a battery of an electric vehicle.

Embodiment 3

The following describes a working principle of an electric drive system with reference to another specific implementation of a DC-DC circuit.

Figure 8:
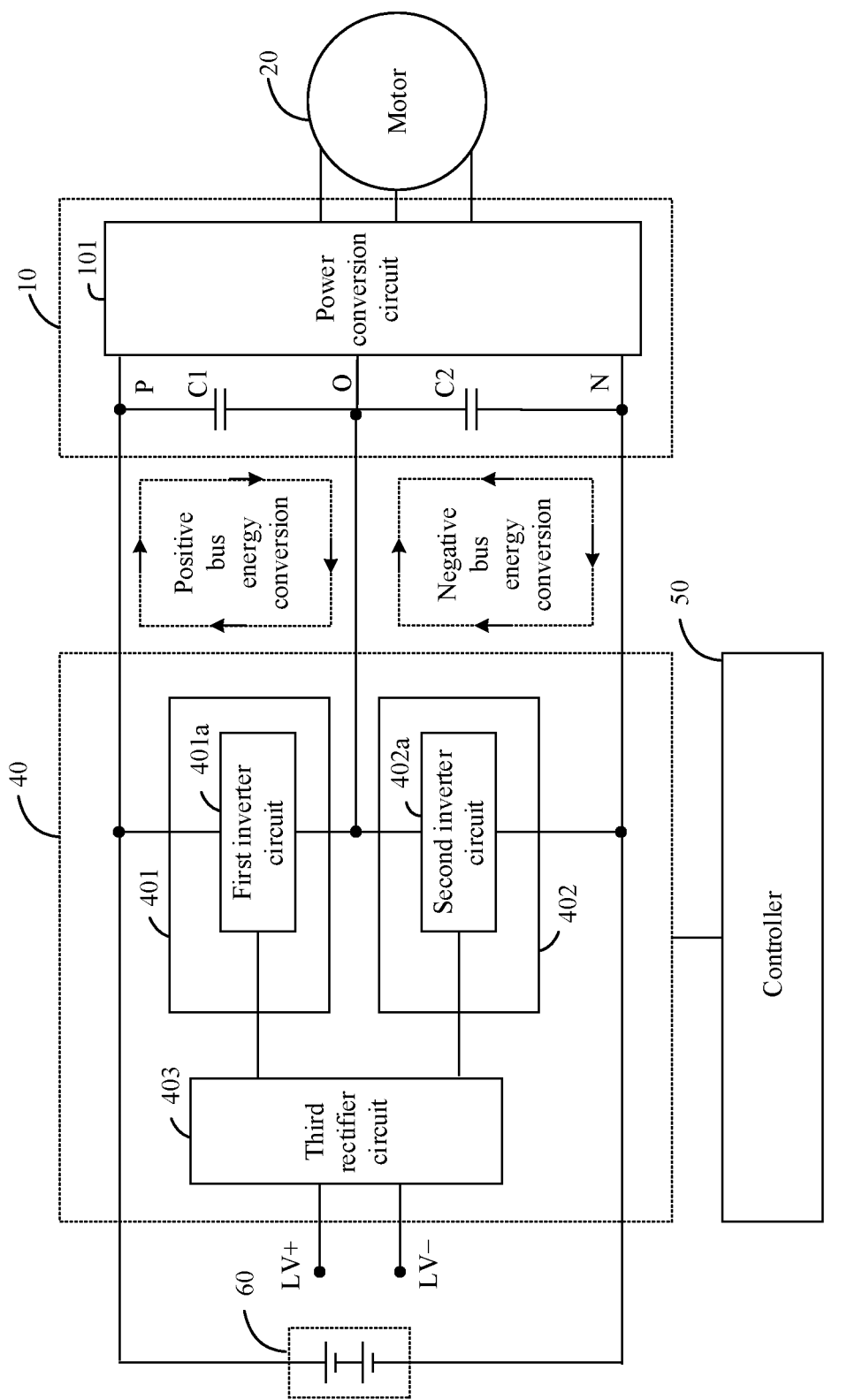
FIG. 8 is a schematic diagram of yet another electric drive system according to an embodiment of this application.

FIG. 8 is a schematic diagram of yet another electric drive system according to this embodiment of this application.

In this embodiment of this application, two conversion circuits of a DC-DC conversion circuit 40 share one output terminal.

A first conversion circuit 401 includes a first inverter circuit 401a, an input terminal of the first inverter circuit 401a is connected to a first bus capacitor C1, and an output terminal of the first inverter circuit 401a is connected to a third rectifier circuit 403.

A second conversion circuit 402 includes a second inverter circuit 402a, an input terminal of the second inverter circuit 402a is connected to a second bus capacitor C2, and an output terminal of the second inverter circuit 402a is connected to the third rectifier circuit 403.

The following provides a description with reference to a specific circuit implementation.

Figure 9:
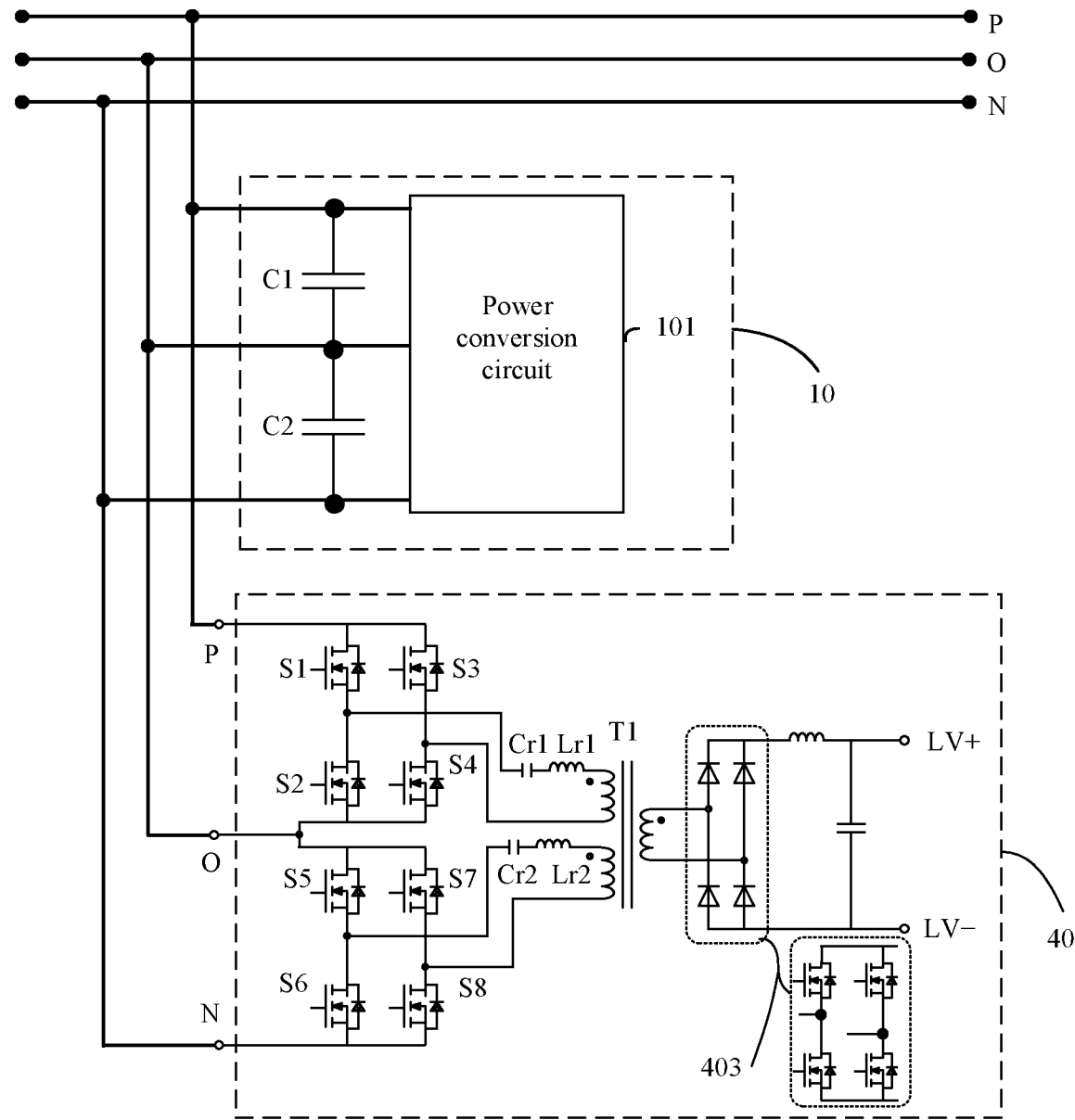
FIG. 9 is a schematic diagram of another electric drive system according to an embodiment of this application.

FIG. 9 is a schematic diagram of another electric drive system according to this embodiment of this application.

A first conversion circuit includes a first full bridge LLC resonant conversion circuit, and a second conversion circuit includes a second full bridge LLC resonant conversion circuit.

S1 to S8 in the figure are controllable switch devices.

For the first conversion circuit, an upper half bridge arm of a first bridge arm includes S1, and a lower half bridge arm of the first bridge arm includes S2, and an upper half bridge arm of a second bridge arm includes S3, and a lower half bridge arm of the second bridge arm includes S4. A neutral point of the first bridge arm is connected to a neutral point of the second bridge arm through a first capacitor Cr1, a first inductor Lr1, and a primary-side winding of a transformer T1. The first capacitor Cr1, the first inductor Lr1, and the primary-side winding of the transformer T1 form an LLC resonant circuit.

For the second conversion circuit, an upper half bridge arm of a first bridge arm includes S5, and a lower half bridge arm of the first bridge arm includes S6, and an upper half bridge arm of a second bridge arm includes S7, and a lower half bridge arm of the second bridge arm includes S8. A neutral point of the first bridge arm is connected to a neutral point of the second bridge arm through a second capacitor Cr2, a second inductor Lr2, and a primary-side winding of a transformer T1. The second capacitor Cr2, the second inductor Lr2, and the primary-side winding of the transformer T2 form an LLC resonant circuit.

The first full bridge LLC resonant conversion circuit and the second full bridge LLC resonant conversion circuit have same dotted terminals of primary-side windings and same quantities of turns of coils and share a magnetic core of a transformer T1, and a secondary-side winding of the transformer T1 is connected to a third rectifier circuit 403.

The first full bridge LLC resonant conversion circuit and the second full bridge LLC resonant conversion circuit have same resonance frequencies.

A control principle of a controller 50 is described below.

The controller 50 controls the first full bridge LLC resonant conversion circuit and the second full bridge LLC resonant conversion circuit based on a same control signal. In other words, the controller 50 has a same control signal phase, a same switching frequency, and a same signal duty cycle for the two full bridge LLC resonant conversion circuits.

Under the control of the controller 50, the DC-DC converter circuit 40 can realize autonomous voltage equalization.

When a potential of a bus neutral point is balanced, operating statuses of the two full bridge LLC resonant conversion circuits are consistent, and there is no energy exchange.

When voltages of a positive bus and a negative bus are inconsistent, because dotted terminals of two primary-side windings of the transformer T1 are the same and share the magnetic core, that is, are in a positive transfer relationship, there is energy exchange between the two full bridge LLC resonant conversion circuits. Energy is transferred from a full bridge LLC resonant conversion circuit with a higher input voltage to a full bridge LLC resonant conversion circuit with a lower input voltage.

To be specific, when the voltage of the positive bus is higher than an absolute value of the voltage of the negative bus, energy is transferred from the first full bridge LLC resonant conversion circuit to the second full bridge LLC resonant conversion circuit, or when an absolute value of the voltage of the negative bus is higher than the voltage of the positive bus, energy is transferred from the second full bridge LLC resonant conversion circuit to the first full bridge LLC resonant conversion circuit, thereby implementing autonomous voltage equalization regulation.

In a possible implementation, each half bridge arm of the third rectifier circuit 403 includes a diode.

In another possible implementation, each half bridge arm of the third rectifier circuit 403 includes a controllable switch tube. In this case, the controller 50 may further control operating statuses of controllable switch tubes in the third rectifier circuit 403 to adjust a total output power of a DC-DC conversion circuit, so as to match a change in a power requirement on an output side.

The controller 50 may adjust a switching frequency of the control signal based on at least one of a voltage sample value of a bus and an output current sample value of a three-level inverter circuit, so as to adjust a total output power of the DC-DC conversion circuit.

For example, in some embodiments, when determining that a potential of a bus neutral point is unbalanced and a difference between the voltages of the positive bus and the negative bus is large, the controller 50 may reduce the switching frequency of the control signal to keep the total output power of the DC-DC conversion circuit unchanged.

The controller 50 may further adjust the switching frequency of the control signal based on a voltage requirement of an output terminal of the DC-DC conversion circuit, so that the output power of the DC-DC conversion circuit matches the change in the power requirement on the output side.

In some embodiments, the controller 50 may control an operating status of a power conversion circuit 101, in other words, a controller of the DC-DC conversion circuit 40 and a controller of the three-level inverter circuit 10 may be integrated together.

In conclusion, the two bus capacitors of the electric drive system provided in this embodiment of this application each are connected in parallel to a conversion circuit. The controller controls the operating statuses of the two conversion circuits to balance the potential of the bus neutral point. By reusing the DC-DC circuit in the electric drive system, the potential of the bus neutral point of the three-level inverter circuit is balanced, and a volume and costs of the three-level electric drive system are reduced.

In this application, a requirement on a voltage withstand value of a power device in each conversion circuit is approximately half of that in the solution in the conventional technology, thereby reducing a switching loss of the power device. In a same output power, a power device with a lower requirement on a voltage withstand value may be selected for the DC-DC circuit in this application, thereby facilitating product selection and design. In the electric drive system provided in this application, the solution in which high-voltage power batteries are used to supply power can be implemented conveniently.

Embodiment 4

Based on the electric drive system provided in the foregoing embodiment, this embodiment of this application further provides a control method applied to the electric drive system. For a specific implementation and a working principle of an electric drive circuit, refer to the description in the foregoing embodiment. Details are not described in this embodiment of this application herein again.

The method includes controlling operating statuses of a first conversion circuit and a second conversion circuit to balance a potential of a bus neutral point.

The following provides specific description with reference to the accompanying drawing.

Figure 10:
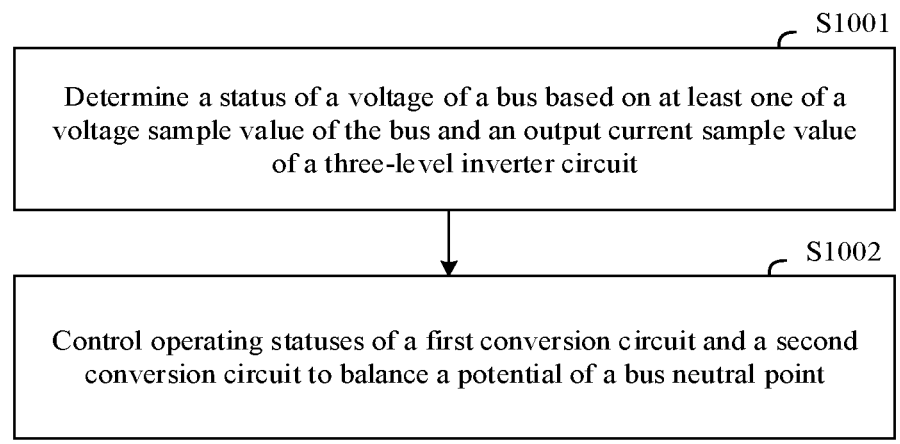
FIG. 10 is a flowchart of a control method for an electric drive system according to an embodiment of this application.

FIG. 10 is a flowchart of a control method for an electric drive system according to this embodiment of this application.

The method shown in the figure includes the following steps.

S1001: Determine a status of a voltage of a bus based on at least one of a voltage sample value of the bus and an output current sample value of a three-level inverter circuit.

The voltage sample value of the bus directly represents current voltages of a positive bus and a negative bus. When a voltage sample value of the positive bus is different from an absolute value of a voltage sample value of the negative bus, it indicates that the potential of the bus neutral point is unbalanced currently.

An output current of the three-level inverter circuit may indicate the current voltages of the positive bus and the negative bus. When the potential of the bus neutral point is balanced, a direct current component of the output current is 0, when the voltage of the positive bus is higher than the voltage of the negative bus, a direct current component of the output current is greater than 0, or when the voltage of the positive bus is lower than the voltage of the negative bus, a direct current component of the output current is less than 0.

S1002: Control the operating statuses of the first conversion circuit and the second conversion circuit to balance the potential of the bus neutral point.

Because the first conversion circuit obtains power from a first bus capacitor and the second conversion circuit obtains power from a second bus capacitor, after the status of the voltage of the bus is determined, the operating statuses of the two conversion circuits may be controlled to balance the potential of the bus neutral point.

In an implementation, an output terminal of the first conversion circuit is connected in parallel to an output terminal of the second conversion circuit.

A principle of balancing the potential of the bus neutral point by using the voltage sample value of the bus is described below.

In this case, when a voltage sample value of the positive bus is greater than an absolute value of a voltage sample value of the negative bus, it indicates that a voltage of the positive bus is greater than an absolute value of a voltage of the negative bus. In this case, an output power of the first conversion circuit is controlled to increase, an output power of the second conversion circuit is controlled to decrease, and a total output power of a DC-DC conversion circuit is kept unchanged. In this case, an amount of power obtained by the first conversion circuit from a first direct current bus increases, so that the voltage of the positive bus decreases. When the voltage of the positive bus decreases to the absolute value of the voltage of the negative bus, the output powers of the first conversion circuit and the second conversion circuit are controlled to be the same.

When a voltage sample value of the positive bus is less than an absolute value of a voltage sample value of the negative bus, it indicates that a current voltage of the positive bus is less than an absolute value of a voltage of the negative bus. In this case, an output power of the first conversion circuit is controlled to decrease, an output power of the second conversion circuit is controlled to increase, and a total output power of a DC-DC conversion circuit is kept unchanged. An amount of power obtained by the second conversion circuit from a second direct current bus increases, so that the absolute value of the voltage of the negative bus decreases. When the absolute value of the voltage of the negative bus decreases to the voltage of the positive bus, the output powers of the first conversion circuit and the second conversion circuit are controlled to be the same.

A principle of balancing the potential of the bus neutral point by using an output current sample value of a three-level inverter circuit is described below.

When the direct current component of the output current sample value is greater than 0, the output power of the first conversion circuit is controlled to increase, the output power of the second conversion circuit is controlled to decrease, and the total output power of the DC-DC conversion circuit is kept unchanged. In this case, an amount of power obtained by the first conversion circuit from the first direct current bus increases, so that the voltage of the positive bus decreases. After the direct current component of the output current sample value changes to 0, the output powers of the first conversion circuit and the second conversion circuit are controlled to be the same.

When the direct current component of the output current sample value is less than 0, the output power of the first conversion circuit is controlled to decrease, the output power of the second conversion circuit is controlled to increase, and the total output power of the DC-DC conversion circuit is kept unchanged. In this case, an amount of power obtained by the second conversion circuit from the second direct current bus increases, so that the absolute value of the voltage of the negative bus decreases. After the direct current component of the output current sample value changes to 0, the output powers of the first conversion circuit and the second conversion circuit are controlled to be the same.

In another possible implementation, the electric drive system uses the implementation shown in FIG. 9.

In this case, a first full bridge LLC resonant conversion circuit and a second full bridge LLC resonant conversion circuit are controlled based on a same control signal. In other words, there is a same control signal phase, a same switching frequency, and a same signal duty cycle for the two full bridge LLC resonant conversion circuits.

When voltages of the positive bus and the negative bus are inconsistent, because dotted terminals of two primary-side windings of a transformer T1 are the same and share a magnetic core, that is, are in a positive transfer relationship, there is energy exchange between the two full bridge LLC resonant conversion circuits. Energy is transferred from a full bridge LLC resonant conversion circuit with a higher input voltage to a full bridge LLC resonant conversion circuit with a lower input voltage to implement autonomous voltage equalization regulation.

In conclusion, by using the control method provided in this embodiment of this application, a voltage of a bus neutral point of is balanced, and a volume and costs of the three-level electric drive system are reduced. In addition, a requirement on a voltage withstand value of a power device in each conversion circuit is approximately half of that in the solution in the conventional technology, thereby reducing a switching loss of the power device. In a same output power, a power device with a lower requirement on a voltage withstand value may be selected for the DC-DC circuit in this application, thereby facilitating product selection and design.

Embodiment 5

Based on the electric drive system provided in the foregoing embodiment, this embodiment of this application further provides a powertrain of an electric vehicle. The powertrain is described below with reference to the accompanying drawings.

Figure 11:
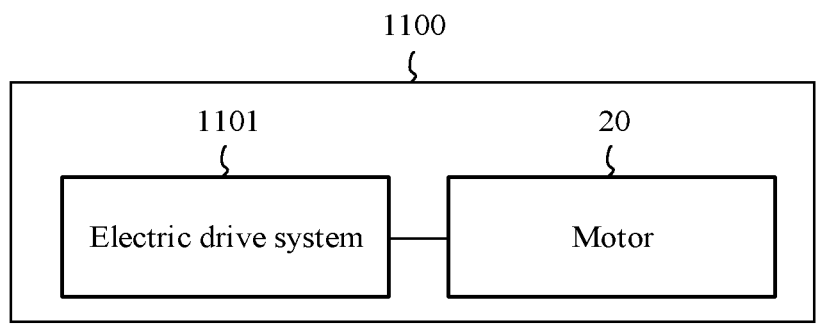
FIG. 11 is a schematic diagram of a powertrain of an electric vehicle according to an embodiment of this application.

FIG. 11 is a schematic diagram of a powertrain of an electric vehicle according to this embodiment of this application.

The powertrain 1100 includes an electric drive system 1101 and a motor 20.

The electric drive system 1101 includes a bus, a three-level inverter circuit, a DC-DC conversion circuit, and a controller.

For a specific implementation and a working principle of the electric drive circuit 1101, refer to the description in the foregoing embodiment. Details are not described in this embodiment of this application herein again.

The motor 20 is connected to an output terminal of the three-level inverter circuit.

The motor is configured to convert electrical energy into mechanical energy to drive the electric vehicle.

In conclusion, the powertrain provided in this embodiment of this application includes the electric drive system. Each of two bus capacitors of the system is connected in parallel to a conversion circuit, to be specific, a first conversion circuit obtains power from a first bus capacitor, and a second conversion circuit obtains power from a second bus capacitor. The controller controls operating statuses of the two conversion circuits to balance a potential of a bus neutral point. The DC-DC conversion circuit of the electric drive system is a key portion for supplying power to a low-voltage system and a battery of the electric vehicle. In this application, by reusing the DC-DC circuit, the potential of the bus neutral point of the three-level inverter circuit is balanced, and a volume and costs of a three-level electric drive system are reduced.

In addition, in this application, a requirement on a voltage withstand value of a power device in each conversion circuit is approximately half of that in the solution in the conventional technology, thereby reducing a switching loss of the power device. In a same output power, a power device with a smaller voltage withstand value may be selected for the DC-DC circuit in this application, thereby facilitating product selection and design. In addition, when a volume of the power batteries remains unchanged, currently, to maximize an endurance mileage of an electric vehicle, high-voltage power batteries are usually selected to supply power. In the electric drive system provided in this application, the solution in which the high-voltage power batteries are used to supply power can be implemented more conveniently.

Embodiment 6

Based on the powertrain of the electric vehicle provided in the foregoing embodiment, this embodiment of this application further provides an electric vehicle. The electric vehicle is described in detail below with reference to the accompanying drawings.

Figure 12:
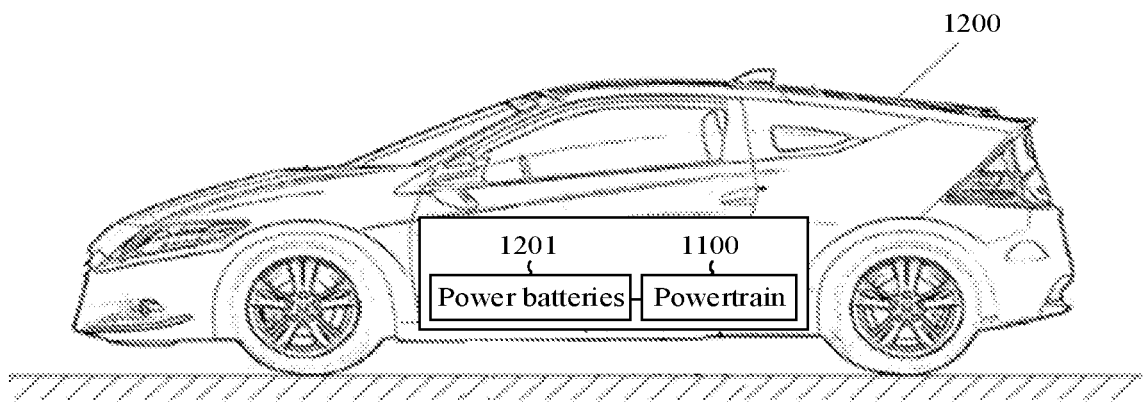
FIG. 12 is a schematic diagram of an electric vehicle according to an embodiment of this application.

FIG. 12 is a schematic diagram of an electric vehicle according to this embodiment of this application.

The electric vehicle 1200 includes power batteries 1201 and a powertrain 1100.

The power batteries are configured to supply a required direct current to the powertrain 1100.

The powertrain 1100 includes an electric drive system and a motor.

The electric drive system includes a bus, a three-level inverter circuit, a DC-DC conversion circuit, and a controller.

For a specific implementation and a working principle of the electric drive circuit, refer to the description in the foregoing embodiment. Details are not described in this embodiment of this application herein again.

Each of two bus capacitors of the electric drive system of the electric vehicle is connected in parallel to a conversion circuit, to be specific, a first conversion circuit obtains power from a first bus capacitor, and a second conversion circuit obtains power from a second bus capacitor. The controller controls operating statuses of the two conversion circuits to balance a potential of a bus neutral point. The DC-DC conversion circuit of the electric drive system is a key portion for supplying power to a low-voltage system and a battery of the electric vehicle. In this application, by reusing the DC-DC circuit, the potential of the bus neutral point of the three-level inverter circuit is balanced, and a volume and costs of a three-level electric drive system are reduced.

In addition, in this application, a requirement on a voltage withstand value of a power device in each conversion circuit is approximately half of that in the solution in the conventional technology, thereby reducing a switching loss of the power device. In a same output power, a power device with a smaller voltage withstand value may be selected for the DC-DC circuit in this application, thereby facilitating product selection and design. In addition, when a volume of the power batteries remains unchanged, currently, to maximize an endurance mileage of an electric vehicle, high-voltage power batteries are usually selected to supply power. In the electric drive system provided in this application, the solution in which the high-voltage power batteries are used to supply power can be implemented more conveniently. In this way, improvement of NEDC efficiency of the electric vehicle is facilitated.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: only A exists, only B exists, and both A and B exist, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

The embodiments in this specification are all described in a progressive manner, for same or similar parts in the embodiments, refer to these embodiments, and each embodiment focuses on a difference from another embodiment. In addition, some or all of the units and modules may be selected based on actual requirements to achieve the objectives of the solutions in the embodiments. A person of ordinary skill in the art may understand and implement the embodiments without creative efforts.

The foregoing description is merely specific implementations of this application. It should be noted that a person of ordinary skill in the art may further make several improvements and modifications without departing from the principle of this application, and these improvements and modifications shall also be considered as falling within the protection scope of this application.

What is claimed is:

1. An electric drive system of an electric vehicle comprising:
   a bus comprising a positive bus, a bus neutral point, and a negative bus;
   a three-level inverter circuit comprising:
      a first bus capacitor coupled between the positive bus and the bus neutral point; and
      a second bus capacitor coupled between the negative bus and the bus neutral point;
   a direct current (DC)-DC conversion circuit comprising:
      a first conversion circuit comprising a first input terminal that is coupled in parallel to the first bus capacitor;
      a second conversion circuit comprising a second input terminal that is coupled in parallel to the second bus capacitor; and
      a first output terminal configured to couple to a low-voltage system or a power battery of the electric vehicle; and
   a controller coupled to the DC-DC conversion circuit and configured to:
      control the first conversion circuit and the second conversion circuit;
      when a first voltage sample value of the positive bus is greater than a first absolute value of a second voltage sample value of the negative bus or a direct current component of an output current sample value of the three-level inverter circuit is greater than 0 and when a first voltage of the positive bus is greater than a second absolute value of a second voltage of the negative bus:

control a first output power of the first conversion circuit to increase;

control a second output power of the second conversion circuit to decrease; and maintain a total output power of the DC-DC conversion circuit; and when the first voltage sample value is less than the first absolute value or the direct current component is less than 0 and when the first voltage is less than the second absolute value:

control the first output power to decrease;

control the second output power to increase; and maintain the total output power.

2. The electric drive system of claim 1, wherein the controller is further configured to control operating statuses of the first conversion circuit and the second conversion circuit based on at least one of a third voltage sample value of the bus or the output current sample value of the three-level inverter circuit.

3. The electric drive system of claim 2, wherein the first conversion circuit comprises a second output terminal, wherein the second conversion circuit comprises a third output terminal, and wherein the second output terminal is coupled in parallel to the third output terminal.

4. The electric drive system of claim 1, wherein the first conversion circuit further comprises:
a first rectifier circuit comprising:
a third input terminal; and
a second output terminal; and
a first inverter circuit comprising:
the first input terminal; and
a third output terminal coupled to the third input terminal,
wherein the second conversion circuit comprises:
a second rectifier circuit comprising:
a fourth input terminal; and
a fourth output terminal; and
a second inverter circuit comprising:
the second input terminal; and
a fifth output terminal coupled to the fourth input terminal.

5. The electric drive system of claim 4, wherein the first conversion circuit and the second conversion circuit are full-bridge inductor-inductor-capacitor resonant conversion circuits.

6. The electric drive system of claim 4, wherein the first rectifier circuit and the second rectifier circuit are full-bridge rectifier circuits, wherein each of the full-bridge rectifier circuits comprises a controllable switch tube, and wherein the controller is further configured to control an operating status of the controllable switch tube.

7. The electric drive system of claim 2, wherein the first conversion circuit comprises a first full-bridge inductor-inductor-capacitor (LLC) resonant conversion circuit, wherein the second conversion circuit comprises a second full-bridge LLC resonant conversion circuit, wherein the first full-bridge LLC resonant conversion circuit and the second full-bridge LLC resonant conversion circuit have same dotted terminals of primary-side windings and same quantities of turns of coils and share a magnetic core of a transformer, wherein a secondary-side winding of the transformer is coupled to a third rectifier circuit, and wherein the first full-bridge LLC resonant conversion circuit and the second full-bridge LLC resonant conversion circuit have same resonance frequencies.

8. The electric drive system of claim 7, wherein the controller is further configured to control the first full-bridge LLC resonant conversion circuit and the second full-bridge LLC resonant conversion circuit based on a control signal.

9. The electric drive system of claim 8, wherein the controller is further configured to adjust a switching frequency of the control signal based on at least one of the first voltage sample value or the output current sample value.

10. The electric drive system of claim 8, wherein the controller is further configured to adjust a switching frequency of the control signal based on a voltage requirement of the first output terminal.

11. The electric drive system of claim 7, wherein the third rectifier circuit is a full-bridge rectifier circuit and comprises a controllable switch tube, and wherein the controller is further configured to control an operating status of the controllable switch tube.

12. The electric drive system of claim 1, wherein the controller is further configured to control an operating status of the three-level inverter circuit.

13. A powertrain comprising:
an electric drive system of an electric vehicle comprising:
a bus comprising a positive bus, a bus neutral point, and a negative bus;
a three-level inverter circuit comprising:
a first bus capacitor coupled between the positive bus and the bus neutral point;
a second bus capacitor coupled between the negative bus and the bus neutral point; and
a first output terminal;
a direct-current (DC)-DC conversion circuit comprising:
a first conversion circuit comprising a first input terminal coupled in parallel to the first bus capacitor;
a second conversion circuit comprising a second input terminal coupled in parallel to the second bus capacitor; and
a second output terminal configured to couple to a low-voltage system or a power battery of the electric vehicle; and
a controller coupled to the DC-DC conversion circuit and configured to:
control the first conversion circuit and the second conversion circuit;
when a first voltage sample value of the positive bus is greater than a first absolute value of a second voltage sample value of the negative bus or a direct current component of an output current sample value of the three-level inverter circuit is greater than 0 and when a first voltage of the positive bus is greater than a second absolute value of a second voltage of the negative bus:
control a first output power of the first conversion circuit to increase;
control a second output power of the second conversion circuit to decrease; and
maintain a total output power of the DC-DC conversion circuit; and
when the first voltage sample value is less than the first absolute value or the direct current component is less than 0 and when the first voltage is less than the second absolute value:
control the first output power to decrease;
control the second output power to increase; and
maintain the total output power; and
a motor coupled to the first output terminal and configured to convert electrical energy into mechanical energy to drive the electric vehicle.

14. The powertrain of claim 13, wherein the controller is further configured to control operating statuses of the first conversion circuit and the second conversion circuit based on at least one of a third voltage sample value of the bus or the output current sample value of the three-level inverter circuit.

15. The powertrain of claim 14, wherein the first conversion circuit comprises a third output terminal, wherein the second conversion circuit comprises a fourth output terminal, and wherein the third output terminal is coupled in parallel to the fourth output terminal.

16. An electric vehicle comprising:
a power battery; and
a powertrain comprising:
an electric drive system configured to couple to the power battery and comprising:
a bus comprising a positive bus, a bus neutral point, and a negative bus;
a three-level inverter circuit comprising:
a first bus capacitor coupled between the positive bus and the bus neutral point;
a second bus capacitor coupled between the negative bus and the bus neutral point; and
a first output terminal;
a direct current (DC)-DC conversion circuit comprising:
a first conversion circuit comprising a first input terminal coupled in parallel to the first bus capacitor;
a second conversion circuit comprising a second input terminal coupled in parallel to the second bus capacitor; and
a second output terminal configured to couple to a low-voltage system or the power battery; and
a controller coupled to the DC-DC conversion circuit and configured to:
control the first conversion circuit and the second conversion circuit;
when a first voltage sample value of the positive bus is greater than a first absolute value of a second voltage sample value of the negative bus or a direct current component of an output current sample value of the three-level inverter circuit is greater than 0 and when a first voltage of the positive bus is greater than a second absolute value of a second voltage of the negative bus:
control a first output power of the first conversion circuit to increase;
control a second output power of the second conversion circuit to decrease; and
maintain a total output power of the DC-DC conversion circuit; and
when the first voltage sample value is less than the first absolute value or the direct current component is less than 0 and when the first voltage is less than the second absolute value:
control the first output power to decrease;
control the second output power to increase; and
maintain the total output power; and
a motor coupled to the first output terminal and configured to convert electrical energy into mechanical energy to drive the electric vehicle,
wherein the power battery is configured to supply a required direct current to the powertrain.

17. The electric vehicle of claim 16, wherein the controller is further configured to control operating statuses of the first conversion circuit and the second conversion circuit based on a third voltage sample value of the bus.

18. The electric vehicle of claim 16, wherein the controller is further configured to control operating statuses of the first conversion circuit and the second conversion circuit based on the output current sample value of the three-level inverter circuit.

19. The electric vehicle of claim 16, wherein the first conversion circuit comprises a second output terminal, wherein the second conversion circuit comprises a third output terminal, and wherein the second output terminal is coupled in parallel to the third output terminal.

20. The electric vehicle of claim 16, wherein the controller is further configured to control an operating status of the three-level inverter circuit.

* * * * *